United States Patent
Madhavan et al.

(10) Patent No.: US 8,327,146 B2
(45) Date of Patent: Dec. 4, 2012

(54) WIRELESS COMMUNICATION USING COMPACT CERTIFICATES

(75) Inventors: Sethu K. Madhavan, Canton, MI (US); Kenneth L. Peirce, Detroit, MI (US); Ki Hak Yi, Ontario (CA); Elizabeth Chesnutt, Troy, MI (US); Ansaf I. Alrabady, Livonia, MI (US)

(73) Assignee: General Motors LLC, Detroit, MI (US)

( * ) Notice: Subject to any disclaimer, the term of this patent is extended or adjusted under 35 U.S.C. 154(b) by 1221 days.

(21) Appl. No.: 12/059,758

(22) Filed: Mar. 31, 2008

(65) Prior Publication Data

US 2009/0249074 A1 Oct. 1, 2009

(51) Int. Cl.
*H04L 9/32* (2006.01)
*H04L 29/06* (2006.01)

(52) U.S. Cl. ........ 713/175; 713/155; 713/156; 713/157; 713/150; 713/173; 713/172; 713/176; 380/278; 380/280; 380/282; 709/213; 709/228

(58) Field of Classification Search .................. 713/155, 713/156, 157, 150, 173, 172; 380/278, 280, 380/282
See application file for complete search history.

(56) References Cited

U.S. PATENT DOCUMENTS

| | | | | |
|---|---|---|---|---|
| 5,717,759 | A * | 2/1998 | Micali | 713/157 |
| 6,321,333 | B1 * | 11/2001 | Murray | 713/156 |
| 6,766,353 | B1 * | 7/2004 | Lin et al. | 709/203 |
| 6,792,530 | B1 * | 9/2004 | Qu et al. | 713/156 |
| 7,284,121 | B2 * | 10/2007 | Williams et al. | 713/156 |
| 7,587,600 | B2 * | 9/2009 | Bodensjo et al. | 713/176 |
| 7,650,494 | B2 * | 1/2010 | Chen et al. | 713/155 |
| 7,734,050 | B2 * | 6/2010 | Tengler et al. | 380/270 |
| 7,742,603 | B2 * | 6/2010 | Tengler et al. | 380/270 |
| 7,849,308 | B2 * | 12/2010 | Suga | 713/157 |
| 7,904,721 | B2 * | 3/2011 | Belenky et al. | 713/175 |
| 8,032,078 | B1 * | 10/2011 | Donich et al. | 455/8 |
| 8,069,346 | B2 * | 11/2011 | Struik | 713/156 |
| 8,171,283 | B2 * | 5/2012 | Pietrowicz et al. | 713/156 |
| 8,230,215 | B2 * | 7/2012 | Laberteaux et al. | 713/156 |
| 2003/0041110 | A1 * | 2/2003 | Wenocur et al. | 709/206 |
| 2004/0181665 | A1 * | 9/2004 | Houser | 713/158 |
| 2005/0039016 | A1 * | 2/2005 | Aissi et al. | 713/176 |
| 2005/0066171 | A1 * | 3/2005 | Simon | 713/175 |
| 2005/0114653 | A1 * | 5/2005 | Sudia | 713/158 |

(Continued)

OTHER PUBLICATIONS

An X.509—Compatible Syntax for Compact Certificates Magnus Nyström and John Brainard Secure Networking—CQRE [Secure] ' 99 Lecture Notes in Computer Science, 1999, vol. 1740/1999, 779, DOI: 10.1007/3-540-46701-7.*

(Continued)

*Primary Examiner* — Syed A. Zia (74) *Attorney, Agent, or Firm* — Anthony Luke Simon; Reising Ethington P.C.

(57) ABSTRACT

A method and communications system for generating and using compact digital certificates for secure wireless communication. Each compact certificate includes a digital signature and only a portion of the data used in generating the signature. The remaining certificate data is pre-stored on one or more wireless devices for which secure communication is desired. Upon receiving a compact certificate, the wireless device authenticates the certificate using its digital signature along with both the data contained in the certificate and the data pre-stored on the wireless device. This approach permits secure connections to be established between wireless devices using relatively small digital certificates.

20 Claims, 7 Drawing Sheets

U.S. PATENT DOCUMENTS

| | | | |
|---|---|---|---|
| 2005/0213758 A1* | 9/2005 | Lenstra et al. | 380/44 |
| 2005/0277420 A1* | 12/2005 | Shin et al. | 455/442 |
| 2010/0095134 A1* | 4/2010 | Srinivasan et al. | 713/193 |
| 2010/0202616 A1* | 8/2010 | Peirce et al. | 380/277 |
| 2011/0029769 A1* | 2/2011 | Aissi et al. | 713/155 |
| 2011/0238987 A1* | 9/2011 | Kherani et al. | 713/168 |

OTHER PUBLICATIONS

An X.509—Compatible Syntax for Compact Certificates; Magnus Nyström, John Brainard Proceedings of the International Exhibition and Congress on Secure Networking—CQRE (Secure) '99.*

* cited by examiner

X.509 Certificate

| Static Content | Possibly Unique Content | Unique Content |
|---|---|---|
| Version<br>Algorithm ID<br>Issuer<br>Subject<br>Public Key Algorithm<br>Public Key<br>Issuer Unique ID<br>Subject Unique ID<br>Signature Algorithm | Expiration Data<br>(Not Before)<br>(Not After) | Serial Number |
| Signature Algorithm | | |
| Signature Value | | |

WIRELESS COMMUNICATION USING COMPACT CERTIFICATES

TECHNICAL FIELD

The present invention relates generally to techniques for secure communication between wireless devices and, more particularly, to authentication techniques using digital certificates to provide secure communication between two entities such as a vehicle and a central call center.

BACKGROUND

Transport Layer Security (TLS) is a known technology used in digital networks to establish and carry out secure communication between two entities. The communicating entities can be devices such as computers or other electronic apparatus capable of digital communication, and the two entities can be communicating as peers or in a client/server configuration. TLS is implemented using digital certificates which, through public key cryptography and a common trusted entity, enable one or both of the communicating entities to authenticate the other and enable the two entities to exchange information confidentially. Secure Socket Layers (SSL) is an earlier form or predecessor of TLS that has been widely used over the Internet.

TLS is commonly used in TCP/IP networks using X.509 digital certificates which are typically issued by a trusted third party certificate authority (CA) and signed with the CA's private key. The holder (subject) of the certificate can then use it to authenticate itself to other entities. The associated CA public key is distributed to those entities as a part of a self-signed certificate. Authentication of a received digital certificate then involves using the CA's public key to decrypt the digital signature and compare the result to the contents actually contained in the certificate. More specifically, when the certificate is originally signed, a hash is performed of the certificate's contents and the result is encrypted using the CA's private key. This encrypted result is used as the digital signature and is appended to the certificate. Then, to authenticate, a recipient of the certificate uses the public key to decrypt the hash, and then compares this decrypted hash result with its own hash of the received certificate data items that it takes using the same hash function. If the two results match, then this indicates that the contents of the certificate are authentic. That authenticated content includes the certificate holder's (subject's) identity and public key so that the recipient of the certificate can now know that the identity is authentic and can communicate confidentially with the subject using its public key.

The basic structure of an X.509 certificate is given in Table I below. It includes three main fields: a TBS (to be signed) Certificate field containing a number of data items, a Signature Algorithm field identifying the algorithm used in producing the signature, as well as a Signature Value field containing the digital signature that is used by the CA to sign the certificate. The details of X.509 v.3 certificates are contained in RFC 3280.

TABLE I

| X.509 Certificate |
|---|
| TBS Certificate |
|   Version |
|   Serial number |
|   Signature |

TABLE I-continued

| X.509 Certificate |
|---|
|   Issuer |
|   Validity |
|     UTC Time |
|     Generalized Time |
|   Subject |
|   Subject Public Key Info |
|   Unique Identifiers |
|   Extensions |
| Signature Algorithm |
| Signature Value |

In wireless vehicle communication between a vehicle and call center, the use of X.509 or other digital certificates enables TLS to be used to authenticate both the vehicle and call center to each other and to allow confidential exchange of data, programming, or commands. Typically, this communication is via a wireless cellular network using CDMA or other suitable communication technology. Because the size of the certificates can be 1024 bytes or more, the exchange of these digital certificates each time a connection is made can be somewhat costly.

SUMMARY OF THE INVENTION

According to an aspect of the invention, there is provided a method of supplying authenticating information to a wireless device, comprising the steps of:

generating a digital signature using authentication information;

forming a digital certificate that includes the digital signature and only some of the authentication information used in generating the digital signature;

receiving a request to establish a secure connection from a wireless device having stored thereon the remainder of the authentication information used in generating the digital signature; and wirelessly transmitting the digital certificate to the wireless device.

In accordance with another aspect of the invention there is provided a method for authenticating a digital certificate, comprising the steps of:

storing on a wireless device a first plurality of certificate data items associated with an entity having a digital certificate containing the data items;

receiving at the wireless device a compact certificate that lacks the first plurality of data items, but that contains a second plurality of certificate data items and a digital signature formed using the first and second pluralities of data items; and validating the compact certificate at the wireless device using the digital signature, the first plurality of data items stored on the device, and the second plurality of data items contained in the compact certificate.

In accordance with another aspect of the invention there is provided a method of configuring a vehicle and call center to permit secure communication between them, comprising the steps of:

generating a vehicle certificate signature using vehicle certificate data and an issuer private key;

generating a call center certificate signature using call center certificate data and an issuer private key;

storing an issuer public key and some of the vehicle certificate data at the call center;

storing an issuer public key and some of the call center certificate data at the vehicle;

programming the vehicle to supply the call center with a compact vehicle certificate containing the vehicle certificate signature and only a portion of the vehicle certificate data; and programming at least one server at the call center to supply vehicles with a compact call center certificate containing the call center certificate signature and only a portion of the call center certificate data.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The methods described further below in conjunction with FIGS. 2-9 can be carried out as part of the vehicle communication system shown in FIG. 1. One particular use of the methods is in establishing secure communication between a vehicle and call center so that data, commands, and programming can be shared between the two entities. However, they could also be used for secure, efficient communication directly between two vehicles, or between a vehicle and other mobile device, or between a vehicle and some fixed facility other than a call center. The methods are also applicable generally to wireless devices of any type, such as those used in wireless sensor networks. Given the disclosure in this specification and its drawings, those skilled in the art will be able to implement the methods and compact certificates disclosed herein for communication between a wide ranges of wireless devices. As used herein, the term "wireless device" includes any device, equipment or facility capable of wireless communication by any means suitable for transmitting digital data. As indicated above, this can include both portable or mobile devices, as well as fixed equipment and facilities such as the call center depicted in FIG. 1.

Figure 1:
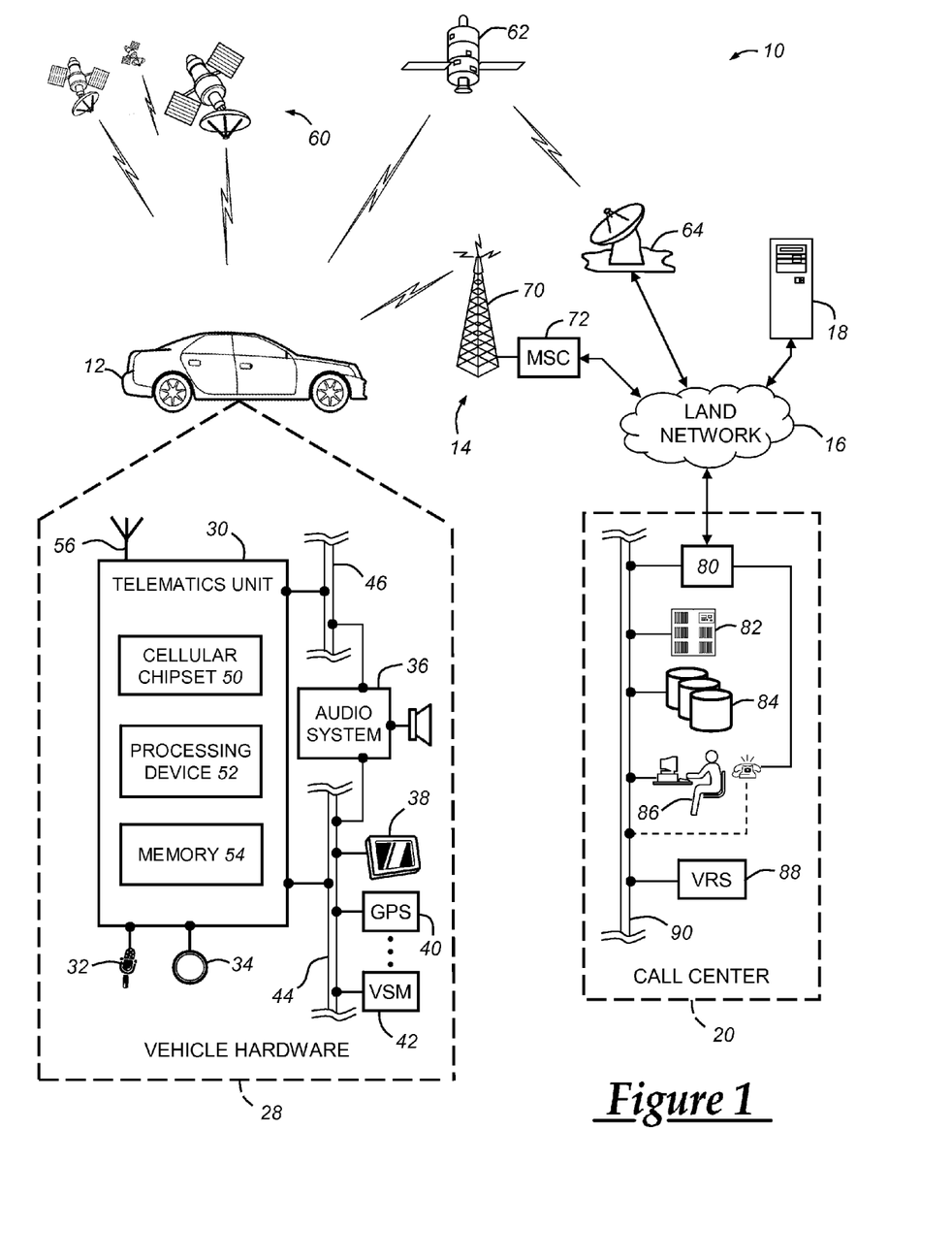
FIG. 1 is a block diagram depicting an exemplary embodiment of a communications system that is capable of utilizing the methods disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs)

72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
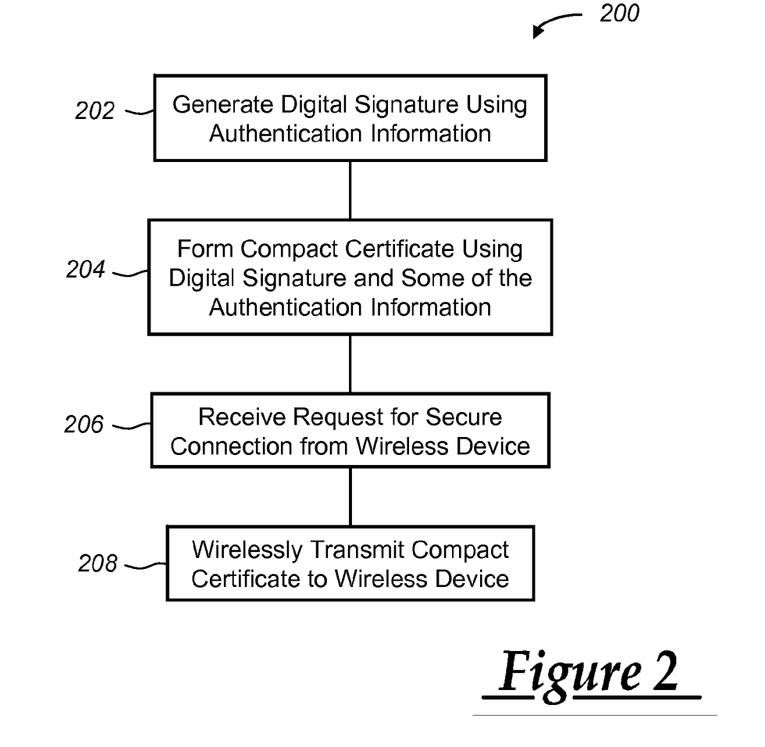
FIG. 2 is a method of supplying authentication information to a wireless device using a digital certificate.

Turning now to FIG. 2, there is shown a method 200 for supplying authenticating information to a wireless device such as the vehicle 12. The process begins at step 202 by generating a digital signature using authentication information. Then, at step 204, a digital certificate is formed using the digital signature and only some of the authentication information. This produces a compact certificate which includes less than all of the information needed for authentication. Thereafter, in use, a request is received from a wireless device to establish secure communication (step 206) and, in response, the compact certificate is (wirelessly) transmitted to the wireless device, as indicated at step 208. As will be understood by those skilled in the art, the authentication information is certificate data that is used in authenticating a digital certificate. For example, the authentication information can comprise certificate data items of the type used in the TBS portion of an X.509 certificate. That is, the digital signature can be generated using all of the certificate data items contained in the TBS Certificate. Then, when the compact certificate is generated, the digital signature is included along with only some of the data items used to generate the signature. Since authentication of the compact certificate requires not some, but all of the authentication information used in generating the signature, those data items not included in the compact certificate can be separately provided to the wireless device. This can be done according to the method of FIG. 3.

Figure 3:
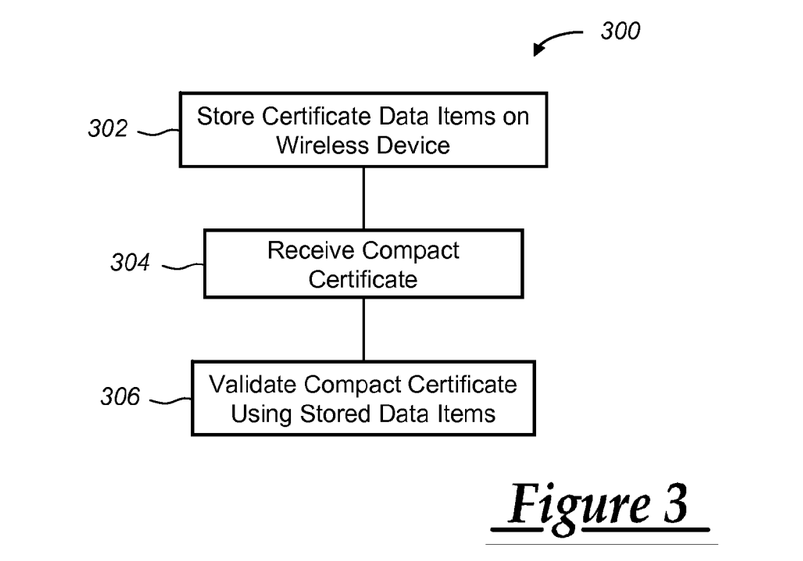
FIG. 3 is a method for authenticating a digital certificate such as that used in the method of FIG. 2.

With reference now to FIG. 3, the method 300 can be used to authenticate a digital certificate such as the compact certificate produced by the method of FIG. 2. In particular, the certificate data items that were used in generating the digital signature, but that were not included in the compact certificate itself can be separately stored on the wireless device, as shown at step 302, and this can be done as part of the initial configuration or as part of an earlier configuration of the wireless device. These excluded data items can be considered a first group or plurality of the total certificate data items contained in the complete digital certificate. Then, when authenticating a server or other entity, the wireless device receives the compact certificate which contains a second group or plurality of certificate data items as well as the digital signature that was formed using both the first and second pluralities of data items. This is indicated at step 304. Finally, at step 306 the compact certificate is validated at the wireless device using the digital signature and both the data items stored on the wireless device and those contained in the certificate.

Figure 4:
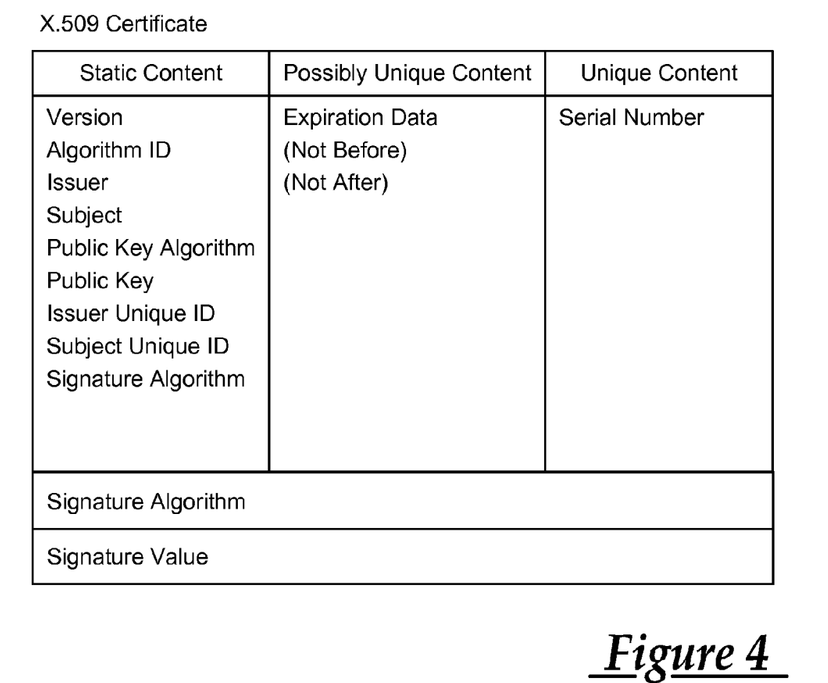
FIG. 4 is table depicting the contents of an X.509 certificate with individual data items being classified by type.

A more specific example of formation of a compact certificate will now be discussed in connection with FIGS. 4 and 5. FIG. 4 depicts an X.509 certificate as disclosed above in Table I, except that the TBS Certificate content is logically separated into columns according to whether that content is static, unique, or possibly unique. Static data refers to data that is common to different digital certificates. For example, where the subject uses only a single issuer for its certificates, the issuer and issuer unique ID data items will not likely change from one certificate to the next. In FIG. 4, the data items have been categorized as they would be expected to be for a single subject using a single issuer so that all of the basic X.509 data items are listed as static. Unique content is that expected to be unique among all certificates issued by the CA. Thus, for example, the certificate serial number is unique, and for X.509 certificates meeting RFC 3280, this uniqueness is a requirement. Finally, some content can be considered "possibly unique." For example, the expiration data (e.g., a "not before" date and/or a "not after" date) is listed as possibly unique since, depending on the desired certificate approach, this data could be relatively static (e.g., a fixed expiration date ten years in the future) or unique (e.g., a date in the near future—hours, days or weeks in the future—calculated to the partial second by adding a fixed period of time onto the exact time the certificate was produced).

As indicated in FIG. 4, the X.509 certificates also include two other items that are not part of the TBS certificate data, but that can be classified into these static-unique-possibly unique categories. The signature algorithm identifies the particular cryptographic algorithm used in generating the signature and this is typically static data from one certificate to the next. The signature value is the digital signature used in signing the certificate and this data is unique to each certificate.

Figure 5:
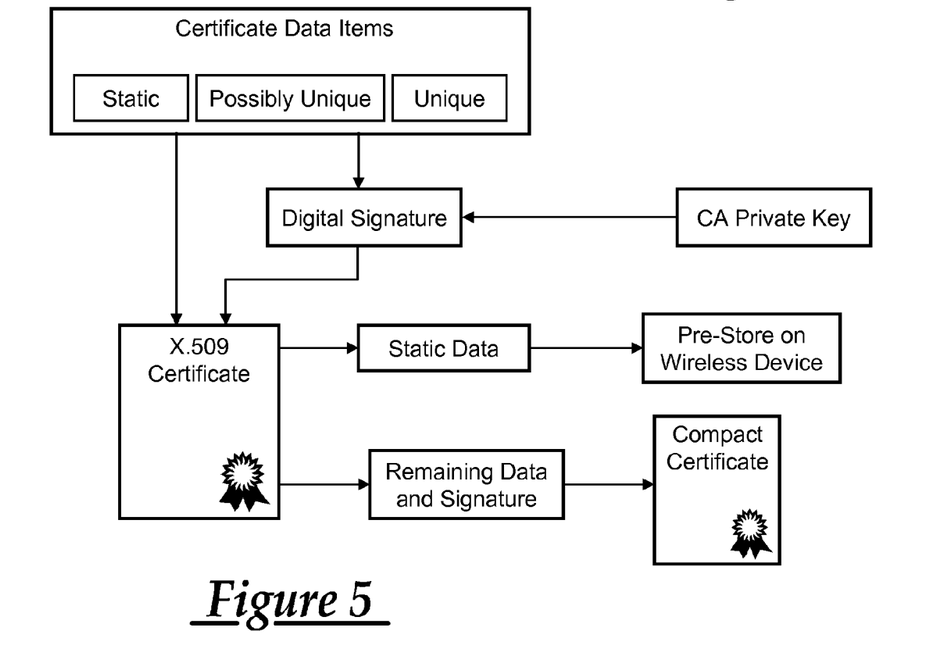
FIG. 5 is a flow diagram showing a process for generating compact certificates.

Referring now to FIG. 5, there is shown diagrammatically a process for generating a compact X.509 certificate. First, the various TBS certificate data items are identified and classified into at least two groups (e.g., static or not). Using these certificate data items and its private key, the CA generates a digital signature which, along with the data items (and signature algorithm) together comprise the full certificate. By a "full" or "complete" certificate, it is meant that the certificate includes both the digital signature and all of the certificate data (authentication information) used to generate the signature. Then, with reference back to FIGS. 2 and 3, of the data included in a full X.509 certificate, the static data used in generating the digital signature can be that part of the authentication information that is excluded from the compact certificate and instead pre-stored on the wireless device. Then, only the signature and remaining data from the full set of certificate fields need be included in the compact certificate.

As used herein, the term static is not intended to have a rigid meaning, but is meant to generally designate content that typically remains unchanged from one certificate for a particular subject to the next. As will be understood by those skilled in the art, any of the certificate data can change from time to time and yet still be considered a static type of data; for example, the certificate version can change due to, for example, a systemic change to a newer certificate protocol. Or, the certificate holder (the subject) may change issuers or the issuer's name might change. Thus, for any particular implementation of the disclosed methods that relies on the categorization of data as being static, it is not important that the data be necessarily unchangeable or that all static data be excluded from the certificate, but rather the methods can be advantageously used to reduce the size of the certificates even in applications where different meanings of "static" are used in categorizing the data.

Figure 6:
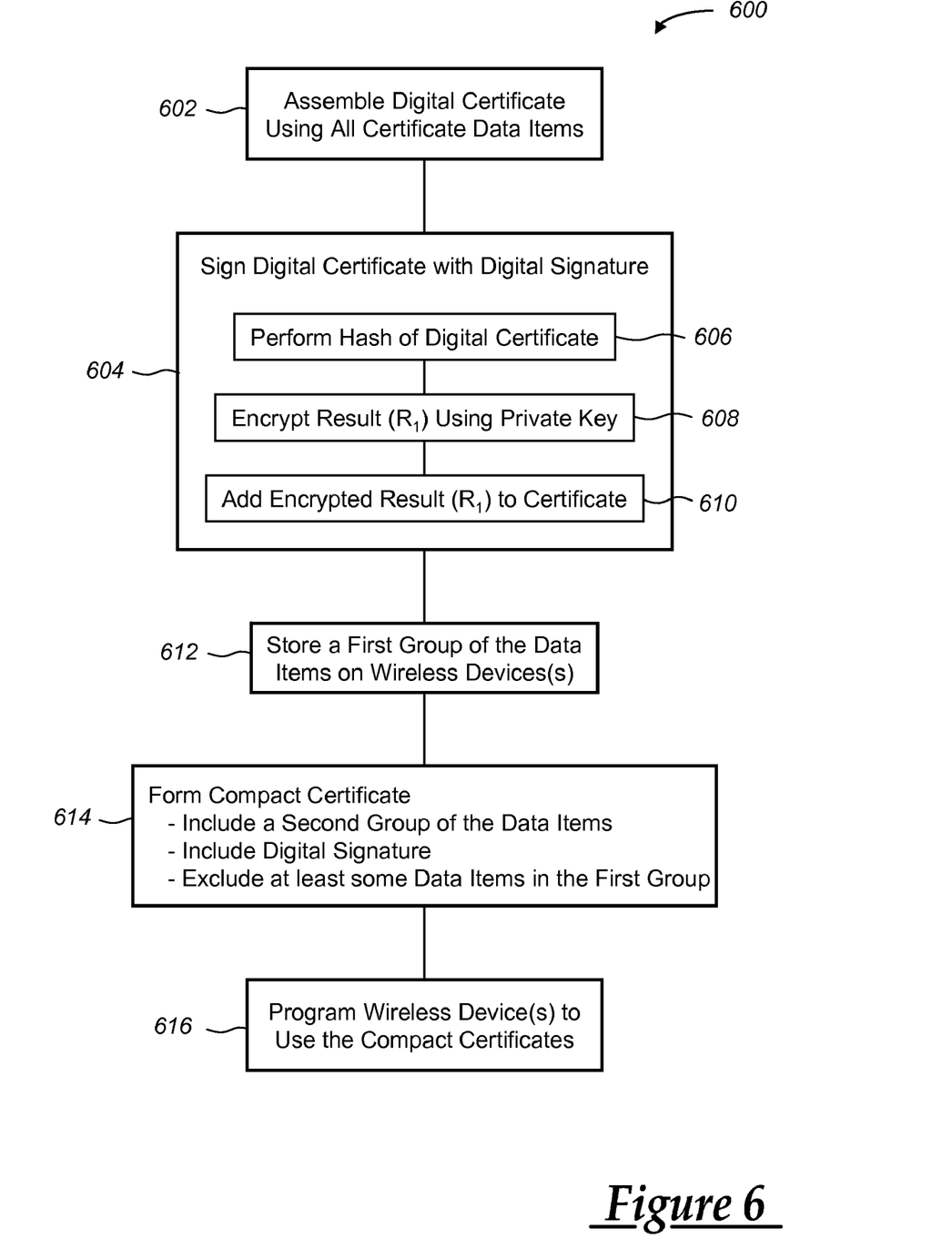
FIG. 6 is a method of configuring a network for using a compact certificate such as that discussed in connection with FIG. 5.
Figure 7:
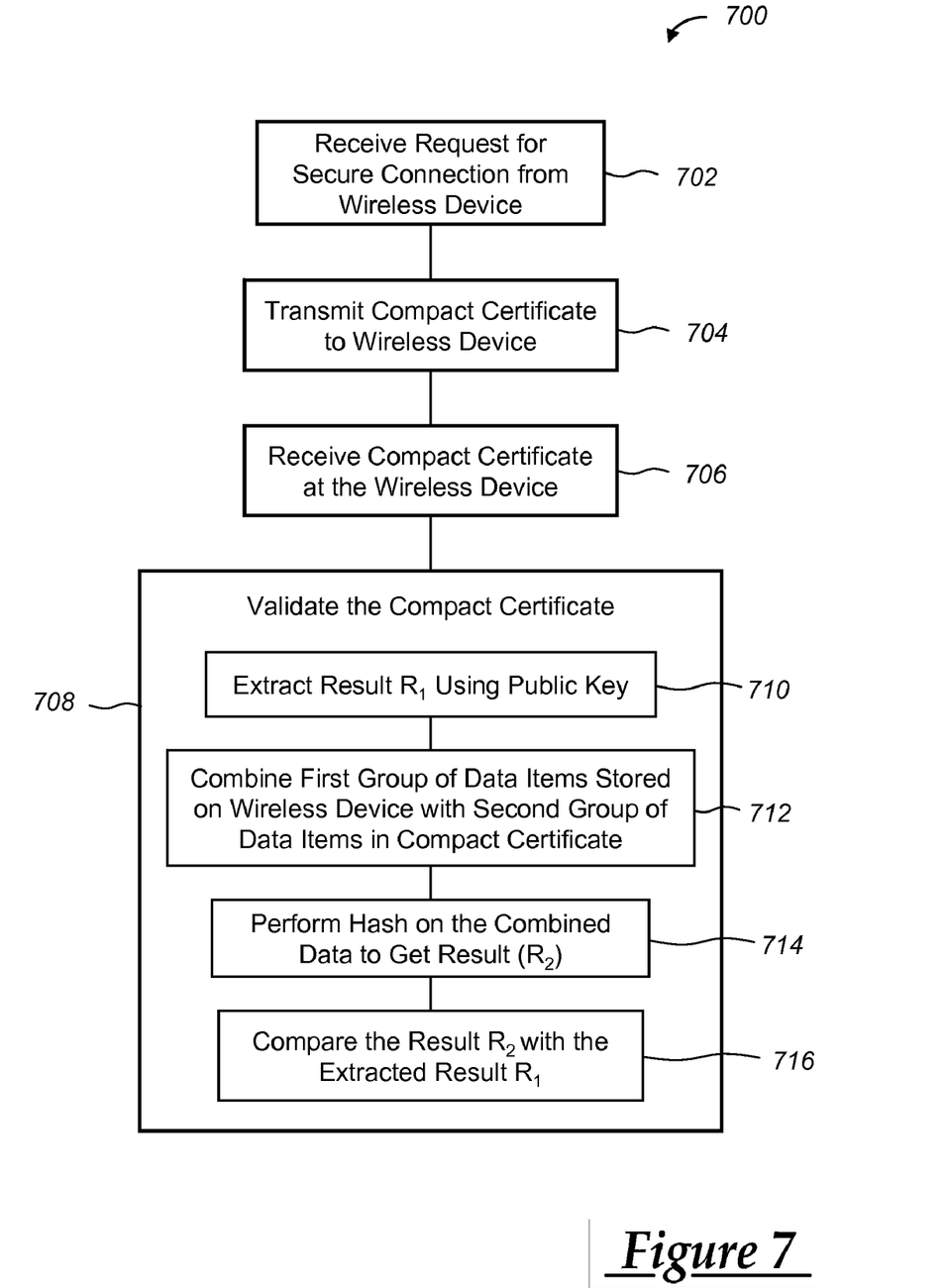
FIG. 7 is a method of validating a compact certificate as a part of establishing a secure connection with a wireless device.

FIGS. 6 and 7 depict, respectively, a method of configuring a network to utilize the compact certificates and a method of validating the compact certificate once the network has been configured. Using these methods, the compact certificates can be used to establish secure connections between wireless devices using many of the steps carried out in conventional TLS handshaking. The method 600 of FIG. 6 begins at step 602 wherein the digital certificate is assembled using all of the TBS certificate data items. Then, the certificate is signed with a digital signature, step 604. This signing can be carried out using public key cryptography as noted above in connection with FIGS. 2 and 5. As is known to those skilled in the art, a digital signature using public key infrastructure can be accomplished by performing a particular mathematical function on the TBS certificate data (i.e., on the authentication information) which generates a result that operates as a fingerprint or digest of the entire collection of data. This result is then encrypted with the CA's private key. Then, when a party receives the certificate, it can decrypt the signature using the trusted CA's public key, and can compare the decrypted result, or fingerprint, with the result of its own check of the data in the received certificate using the same mathematical function. If the two results match, then the certificate is valid and the recipient can be certain that the received certificate has not been altered.

Various mathematical functions can be used in generating the fingerprint or digest used to validate the certificate. Preferably, a cryptographic hash function is used which provides a fixed size result and suitable uniqueness. For example, a SHA-2 hash function such as SHA-256 can be used. Encryption of the hash result can also be done using different types and/or sizes of keys. For example, an ECC or RSA cryptographic key approach can be used. The RSA algorithm is a well known approach and preferably is done using public keys of 2048 bits or greater (e.g., 3072) in size. ECC (elliptic curve cryptography) permits good security with smaller keys, such that a 256 bit public key can, for example, be used.

Thus, in step 604, signing of the digital certificate involves several steps. First, a hash of the TBS certificate data is performed, step 606, which generates a digest or result ($R_1$) that uniquely identifies the contents of the certificate. Then, at step 608, the result $R_1$ is encrypted using the CA's private key, and finally, the now encrypted result $R_1$ is appended to the certificate, step 610. At this point, a complete digital certificate has been produced and, as noted above, the process and algorithms used to generate this complete certificate can be conventional ones that are well known to those skilled in the art.

At step 612, a first group or plurality of the data items used in generating the digital signature are stored on one or more wireless devices. Preferably, this information is stored on any devices for which it might be desirable to later establish a secure connection with the subject of the compact certificate. The particular data selected to be stored on the wireless device rather than being included in the compact certificate can be predetermined as desired or necessary for a particular application. For example, as discussed above in connection with FIGS. 4 and 5, static content from the full certificate can be pre-stored on the wireless device and excluded from the compact certificate.

In conjunction with the storage of certificate data at the wireless device(s), the compact certificate is formed at step 614 using the digital signature and a second group of the data items used to generate the signature. At least some of the data items in the first group that are stored on the wireless device(s) is excluded from the compact certificate. Thus, in one embodiment, the compact certificate includes all of the TBS certificate data items that were not stored on the wireless device(s) in step 612. In another embodiment, some but not all of the certificate data items stored on the wireless device(s) are included on the compact certificate.

The last step 616 in the configuration process is to program the wireless device(s) such that, in operation during normal use, they pull the stored data from the device and add it to the received certificate data as a part of validating the compact certificate. This validation will be described below in connection with FIG. 7. As will be appreciated, the steps 612-616 can be done in a different order than shown or can be done simultaneously. For example, both the programming and storage of certificate data at the wireless devices can be done together, and this can be done during the original manufacturing of the device(s).

Turning now to FIG. 7, the method 700 is shown depicting how the compact certificates are used and processed as a part of establishing authenticity and secure communication with the holder of a certificate. This method assumes that the communicating entities have been configured according to FIG. 6 or otherwise to use the compact certificates. At step 702, an entity receives a request from a wireless device to establish a secure connection. In response, the entity transmits its compact certificate to the wireless device, step 704, which is then received by the device, step 706. Then, at step 708, the wireless device validates the compact certificate. As noted above, this validation process generally involves examining the fingerprint contained in the digital signature to confirm that the combination of data in the certificate and that previously stored on the wireless device together match the data used to generate the fingerprint at the time the certificate was signed.

Thus, step 708 begins with the result $R_1$ being extracted from the certificate's digital signature using the public key associated with the private key that was used to encrypt the result $R_1$. This public key can be pre-stored on the wireless device, which could also be done as a part of the FIG. 6 process of configuring the device, or it can be contemporaneously acquired by the device. Then, to confirm this extracted result, the wireless device combines the first group of certificate data stored on the device with the second group of certificate data contained in the received compact certificate, as indicated at step 712. Then, at step 714, the device performs a hash of the combined data using the same hash function that was used to generate the signature. For compact X.509 certificates, the particular hash function used can be identified from the Signature Algorithm field or, where that data is excluded from the compact certificate and made a part of the data pre-stored on the wireless device, it can be pulled from memory on the wireless device. In another embodiment, the entities using the compact certificates may be configured to only use a single, predetermined signature fingerprinting function, in which case the particular mathematical function used need not be specified at all.

The last step 716 in the validation process is to compare the result $R_2$ of the hash function performed in step 714 at the wireless device with the extracted result $R_1$ to determine if they match. If so, the certificate is valid and the entities can proceed with establishment of a secure connection. If not, then authenticity of the subject of the certificate cannot be established and the connection process can then be aborted by the wireless device.

Figure 8:
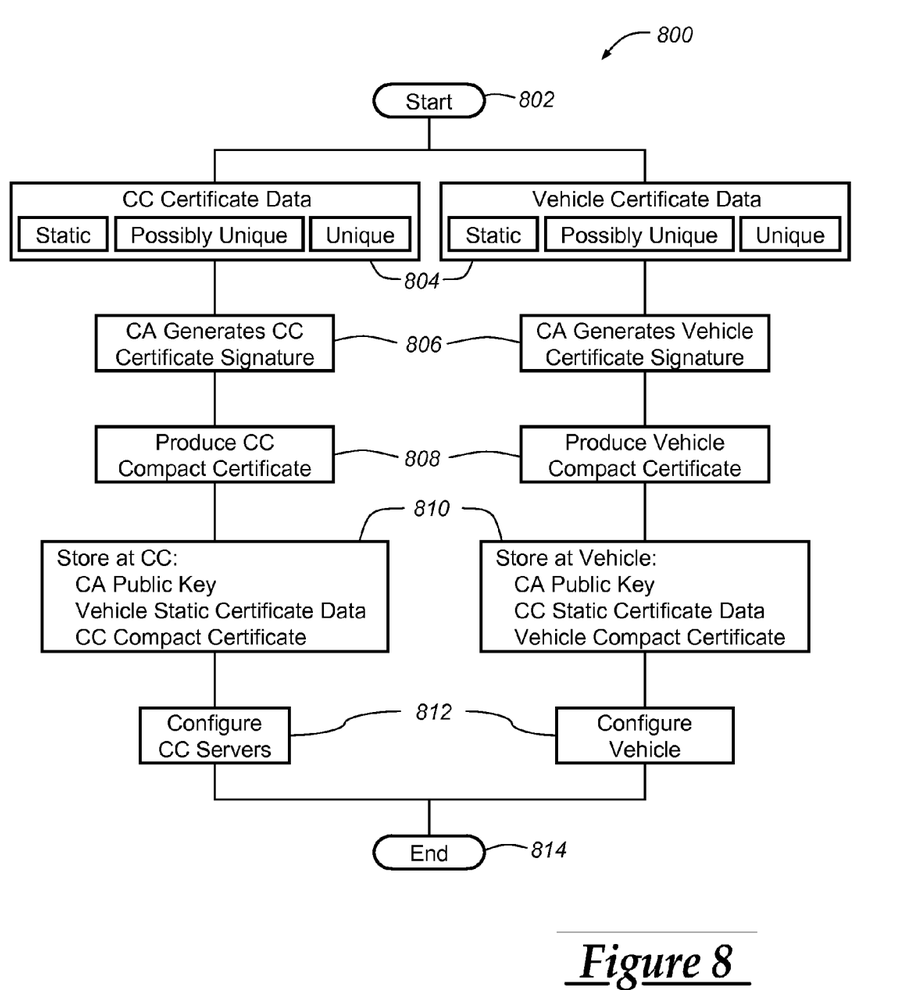
FIG. 8 is a method of configuring a vehicle and call center to enable the use of compact certificates for subsequent secure communication between the vehicle and call center.
Figure 9:
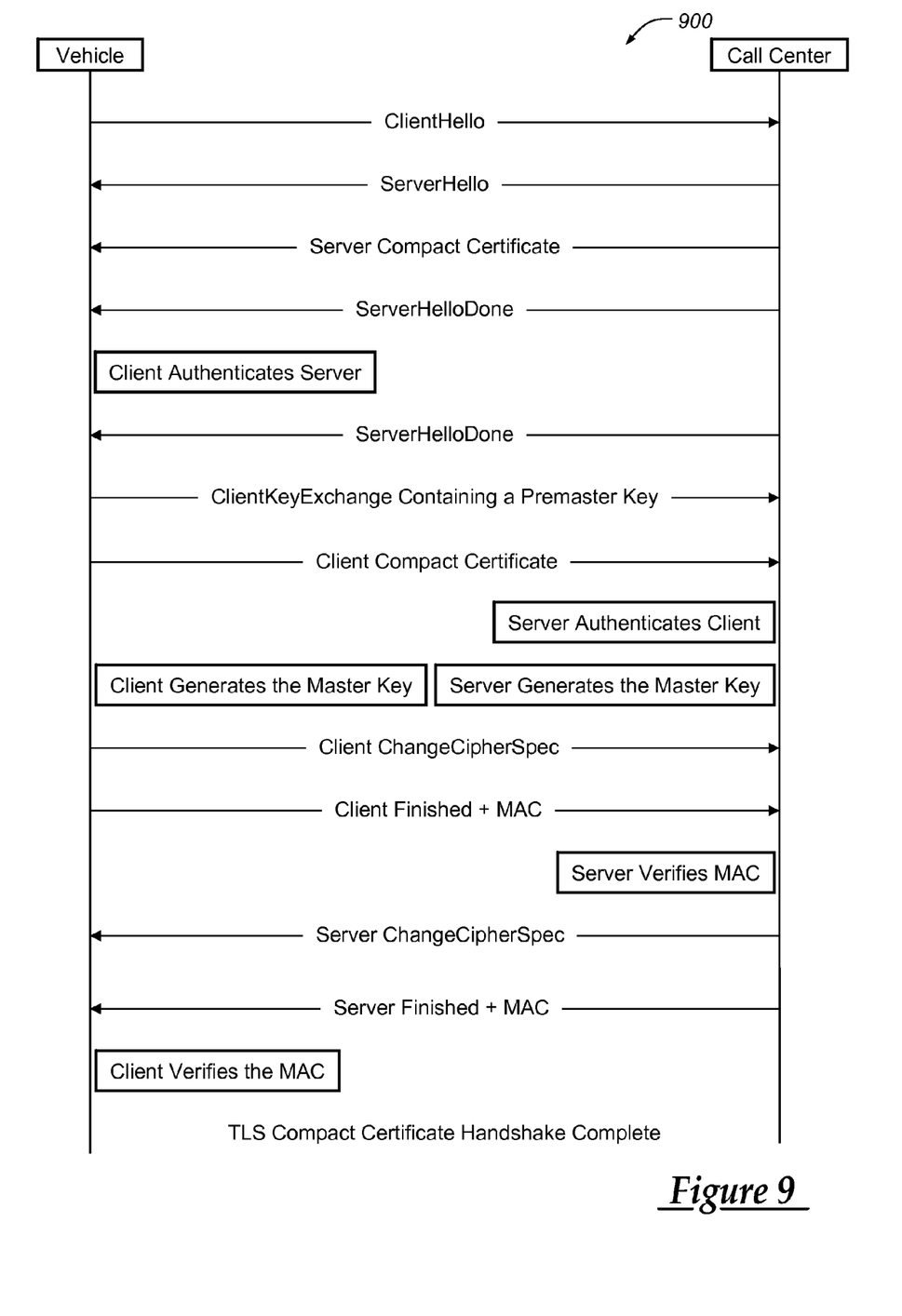
FIG. 9 is a method of using compact certificates as part of a TLS handshaking process that can be carried out once the vehicle has been put into service.

Those skilled in the art will recognize that there exists numerous applications of the methods and compact certificates described above in connection with FIGS. 2-7. Referring now to FIGS. 8 and 9 and with reference back to FIG. 1, one such specific application will now be described; namely, use of the compact certificates to establish secure communication between the vehicle 12 and call center 20. This application involves mutual authentication; that is, both the vehicle and the call center provide the other with their compact certificates so that each entity can validate the identity of the other. It will of course be appreciated that secure communication with the vehicle 12 can be established without using this mutual authentication; for example, in other embodiments the vehicles need not have their own issued certificates, but rather only the call center's compact certificate is used to authenticate it to the vehicle and to establish confidentiality. Alternatively, one of the two entities can use the compact certificates with the other using complete certificates.

The method of FIG. 8 can be used to configure the system 10 to enable the use of compact certificates for subsequent secure communication between the vehicle 12 and call center 20. The method 800 starts at step 802 and involves in effect two separate processes—one to configure the call center (CC) and set up its compact certificate and the other to configure the vehicle and set up its compact certificate. These processes can be carried out substantially independently of each other, except that storage of portions of each entity's certificate data at the other requires first that the data be identified and provided to the other. The two processes contain essentially the same steps and so these steps are identified with the same reference numerals and are only described once below. For each entity, the process involves first identifying and/or assembling the data to be used in the certificate and, in particular, the TBS data that forms the basis of the certificate fingerprint used in the signature. This is shown at step 804. This step also involves identifying which data will be included in the compact certificate for each entity versus what will be pre-stored on the other. Separation of the data into these two groups can be carried out based at least in part on whether they can be considered static or not, such as by using the categorizations described above in connection with FIG. 4. Alternatively, the division of data can be done on some other basis as desired or necessary for a particular application.

Then, at step 806, a certificate authority (CA) generates a certificate signature, and this can be done according to the FIG. 6 process described above. Either the same or different CAs can be used for the vehicle certificate versus the call center certificate. For example, the same CA can be used to issue both the vehicle and call center compact certificates and can use the same private key to digitally sign each certificate. Also, although a trusted third party entity can be used as the CA, it will be appreciated that in the vehicle environment described herein, the call center 20 itself can act as the CA and issue certificates both for itself and for the vehicles. Once the signature is generated the compact certificate is formed, step 808, and the call center 20 then stores the CA public key, its compact certificate, and the static or other data that was not included in each vehicle's compact certificate, step 810. Similarly, at this step the vehicle stores in its telematics unit 30 the CA public key, its compact certificate, and the certificate data that was excluded from the call center's compact certificate. Finally, at step 812 the call center and vehicle are configured to (1) send their compact certificates to the other in response to a TLS hello or certificate request message and (2) process the received compact certificates using the stored certificate data previously received for the other entity. This involves providing both the call center servers (e.g., server 82) and the vehicle telematics unit 30 with the programming needed to (1) retrieve and send their compact certificate and (2) execute the certificate validation procedure needed to validate the received certificate. This validation can be carried out according to the FIG. 7 process described above. The method then ends at block 814.

Preferably, the method of FIG. 8 is carried out during a period of time in which a trusted relationship exists between the vehicle telematics unit and call center. As used herein, a trusted relationship exists during common control of the telematics unit and call center or during a trusted relationship between entities that control the telematics unit and call center. This will typically be at least during manufacturing of the vehicle with its telematics unit. However, this trusted relationship can exist past the manufacturing point, such as up until the time of delivery of the vehicle by the manufacturer to a dealer, or up until the time of delivery of the vehicle by a dealer to a customer.

FIG. 9 depicts a method 900 of using the compact certificates generated by the method of FIG. 8 as part of a TLS handshaking process that can be carried out once the vehicle 12 has been put into service. As will be appreciated by those skilled in the art, the method 900 follows the standard TLS handshaking protocol established in RFC 4346, but using the compact certificates and configured programming of each entity described in FIG. 6, and the validation approach of FIG. 7. The sequence of messages exchanged between the vehicle 12 and call center 20 are depicted in order beginning at the top of FIG. 9. This process assumes that a completed cellular connection has already been established between the vehicle and call center and that the connection permits packetized data communication via IP, although other protocols or data exchange methodologies could be used. As is known to those skilled in the art, such data communication between the vehicle and call center can be carried out either using a data connection or via data communication over a voice connection using known techniques.

The TLS handshaking begins with the vehicle 12 sending a ClientHello message requesting establishment of a secure connection and specifying the desired encryption, for example, TLS_ECDH_ECDSA_WITH AES_128_CBC_SHA, which is identified in RFC 4492. The client hello message also contains the telematics unit serial number which can be used by the call center to determine which vehicle is making the request. The call center responds with a ServerHello message specifying the encryption to be used which for the vehicle communication system 10 will generally be the pre-established cipher suite identified by the vehicle in the ClientHello message. The call center then sends its compact certificate containing its public key, followed by a CertificateRequest message soliciting the vehicle's compact certificate so that the call center can authenticate the vehicle. The call center then completes this message with a ServerHelloDone message.

Having received the call center compact certificate, the vehicle authenticates the call center using the previously stored call center certificate data, and again this can be done according to the process of FIG. 7. If validated, the vehicle then sends to the call center a ClientKeyExchange message including a premaster key encrypted with the call center's public key. The vehicle also sends its compact certificate as a response to the call center's CertificateRequest message. The call center then authenticates the vehicle's compact certificate. Both the vehicle and call center use the shared premaster key to generate a master key (symmetric session key), following which the vehicle sends a ChangeCipherSpec message telling the call center that all subsequent messages from the vehicle will be encrypted with the master key. The vehicle then sends a Finished message that contains a MAC (message authentication code) covering the previous handshaking messages. The call center verifies the MAC and then sends its own ChangeCipherSpec message telling the vehicle that all subsequent messages from the call center will be encrypted with the master key. The call center then sends its Finished message and MAC, which is then verified by the vehicle. If all steps are carried out successfully, then the TLS handshaking is complete and the secure connection has now been established with both the vehicle and call center now using the master key to encrypt the messages sent back and forth. Thus, it will be appreciated that this method allows use of standard TLS hello and handshake protocol to establish a secure connection, but in a manner that requires much less data exchange which can significantly reduce the data transmission cost of establishing the connection.

The programming of the vehicle and call center used to carry out the processes of FIGS. 6-9 can be stored on computer-readable memory and executed by a suitable microprocessor-based device. For example at the vehicle 12, the CA's public key, the vehicle's compact certificate, the static call center certificate data, and the associated programming can all be stored in the telematics unit memory 54. At the call center 20, the CA's public key, the call center's compact certificate, the static vehicle certificate data can be stored in the database 84, with the necessary programming for the server 82 being stored in its own internal memory. Other such arrangements will be apparent to those skilled in the art.

Apart from vehicle to call center communications, the compact certificates can be used for other communications to and from the vehicle, such as vehicle to vehicle communication or between a vehicle and a local network over WiFi or other wireless communication protocols. Furthermore, the use of compact certificates can be used for non-automotive applications.

Moreover, different certificates can be used by the vehicle for connection via cellular system 14 versus other types of wireless connections such as via satellite 62 or via a WiFi or similar short range wireless networking. As one specific example, communication over cellular network 14 can be done via CDMA using a compact certificate having the following elements:

Compact X.509 Certificate
1. Serial Number—16 bytes
2. Expiration Date—8 bytes
3. ECC public key—32 bytes
4. SHA-256 certificate signature—32 bytes The foregoing compact X.509 certificate can be developed from an ECDSA (ECC) X.509 v.3 certificate with an SHA-256 signature, resulting in a total certificate size of only 88 bytes. As another example, for a WiFi connection the following compact certificate can be formed by using an RSA 2048 certificate with SHA1-RSA signature:

Compact RSA 2048 Certificate
1. Serial Number—16 bytes
2. Expiration Date—8 bytes
3. RSA 2048 public key—256 bytes
4. SHA-256 certificate signature—256 bytes The size of this compact RSA 2048 certificate is 536 bytes. Similarly, as another example, for a compact RSA 3072 certificate with the same four data items, but using a 384 byte public key, the total certificate size is 792 bytes. Note that in these examples, the compact certificate includes all three types of data shown in FIG. 4—static (public key), possibly-unique (expiration date), and unique (serial number).

Although some of the above-discussion such as in connection with FIGS. 5 and 6 refer to the formation of complete certificates in the process of producing the disclosed compact certificates, it will be appreciated that it is not necessary that a complete certificate be fully assembled in order to produce the compact certificates. Rather, all that is needed for the illustrated embodiments is that the certificate data items used in generating the signature be assembled together for purposes of the hash function or other signing function, and then the signature be generated. Then, the compact certificate can be produced from the signature and selected data items.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in the illustrated embodiment, all communication and processing of compact certificates by the vehicle 12 are carried out using the telematics unit 30; however, it will be appreciated that other vehicle systems could be used for some or all of these tasks. All such other embodiments, changes, and modifications are intended to come within the scope of the appended claims.

As used in this specification and claims, the terms "for example," "for instance," "such as," and "like," and the verbs "comprising," "having," "including," "containing," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for authenticating a digital certificate, comprising the steps of:
storing on a wireless device a first plurality of certificate data items associated with an entity having a digital certificate containing the data items;
receiving at the wireless device a compact certificate that lacks the first plurality of data items, but that contains a second plurality of certificate data items and a digital signature formed using the first and second pluralities of data items; and
validating the compact certificate at the wireless device using the digital signature, the first plurality of data items stored on the device, and the second plurality of data items contained in the compact certificate.

2. The method of claim 1, wherein the method further comprises carrying out the following steps at one or more other devices prior to the receiving step:
generating the digital certificate containing all of the data items;
signing the digital certificate by applying a digital signature formed using all of the data items;
forming the compact certificate such that it includes the digital signature and the second plurality of data items, but excludes at least some of the first plurality of data items; and
wirelessly transmitting the compact certificate to the wireless device.

3. The method of claim 2, wherein the signing step further comprises performing a mathematical function on the data items and encrypting the result using a private key, and wherein the step of validating the compact certificate further comprises the steps of:
extracting the result contained in the digital signature by decrypting the digital signature using a public key associated with the private key;
combining the first plurality of data items stored on the wireless device with the second plurality of data items contained in compact certificate;
performing the mathematical function on the combined data items, and
comparing the result of the mathematical function performed at the wireless device with the result extracted from the digital signature.

4. The method of claim 1, wherein the storing step further comprises storing static content from the digital certificate on the wireless device.

5. The method of claim 1, wherein the wireless device is a telematics unit installed in a vehicle and the entity is a call center that communicates with the telematics unit via a wireless carrier system, and wherein the storing step further comprises storing on the telematics unit at least some of the static data contained in the digital certificate.

6. The method of claim 5, wherein the storing step further comprises storing the static data on the telematics unit prior to delivery of the vehicle to a customer and wherein the receiving and validating steps are carried out after delivery of the vehicle to the customer.

7. The method of claim 5, further comprising the step of storing on the telematics unit a public key issued by the call center, and wherein the validating step further comprises validating the compact certificate using the public key.

8. The method of claim 5, further comprising the step of replacing at least some of the stored static data with newer data.

9. A method of supplying authenticating information to a wireless device, comprising the steps of:
generating a digital signature using authentication information;
forming a digital certificate that includes the digital signature and only some of the authentication information used in generating the digital signature;
receiving a request to establish a secure connection from a wireless device having stored thereon the remainder of the authentication information used in generating the digital signature; and
wirelessly transmitting the digital certificate to the wireless device.

10. The method of claim 9, wherein the forming step comprises forming a compact certificate having a serial number, expiration data, public key, and the digital signature.

11. The method of claim 9, wherein the forming step comprises forming a compact certificate that includes the digital signature and all of the authentication information except for that portion stored on the wireless device.

12. The method of claim 9, wherein the digital certificate is one of a number of different digital certificates generated for a particular entity and wherein the authentication information includes static content that is common to the different digital certificates and unique content that is different for the different digital certificates;

wherein the generating step further comprises generating the digital signature using the static and unique content;

wherein the forming step further comprises forming the digital certificate using at least the digital signature and all of the unique content; and wherein the method further comprises the step of providing at least some of the static content to the wireless device in advance of the receiving step.

13. The method of claim 9, wherein the generating step further comprises generating the digital signature using a private key having an associated public key stored on the wireless device.

14. The method of claim 9, wherein the wireless device is a vehicle telematics unit and the method is carried out at a call center, and wherein the generating step further comprises carrying out the following steps during a trusted relationship between the call center and telematics unit:

generating the digital signature using a private key having a corresponding public key; and storing the public key and the portion of the authentication information on the telematics unit.

15. The method of claim 14, wherein the transmitting step further comprises sending the digital certificate from the call center to the telematics unit via cellular communication using CDMA.

16. A method of configuring a vehicle and call center to permit secure communication between them, comprising the steps of:

generating a vehicle certificate signature using vehicle certificate data and an issuer private key;

generating a call center certificate signature using call center certificate data and an issuer private key;

storing an issuer public key associated with the issuer private key of the vehicle and some of the vehicle certificate data at the call center;

storing an issuer public key associated with the issuer private key of the call center and some of the call center certificate data at the vehicle;

programming the vehicle to supply the call center with a compact vehicle certificate containing the vehicle certificate signature and only a portion of the vehicle certificate data; and programming at least one server at the call center to supply vehicles with a compact call center certificate containing the call center certificate signature and only a portion of the call center certificate data.

17. The method of claim 16, wherein the generating steps both further comprise generating the certificate signatures using the same issuer private key and the storing steps both further comprise storing the same issuer public key at both the vehicle and call center.

18. The method of claim 16, wherein the portions of certificate data for each of the compact certificates include a serial number, expiration data for the certificate, an associated public key, and its certificate signature.

19. The method of claim 16, wherein the programming steps both further comprise storing executable computer code that, upon execution, generates the compact certificates such that they have a size of no greater than 792 bytes, wherein the executable code is stored in the vehicle telematics unit and at the call center.

20. The method of claim 16, wherein the programming steps both further comprise storing executable computer code that, upon execution, generates the compact certificates such that they have a size of no greater than 88 bytes, wherein the executable code is stored in the vehicle telematics unit and at the call center.

* * * * *